United States Patent [19]

Marinho et al.

[11] Patent Number: 5,018,187

[45] Date of Patent: May 21, 1991

[54] MOBILE TELEPHONE INTRASYSTEM AND INTERSYSTEM ENHANCED HANDOFF METHOD AND APPARATUS FOR LIMITING TRUNK SWITCHING CONNECTIONS

[75] Inventors: John A. Marinho, Chatham, N.J.; Steven J. Pilgrim, Darien, Ill.; I-Hsiang Yu, Cedar Knoll, N.J.

[73] Assignee: AT&T Bell Laboratories, Murray Hill, N.J.

[21] Appl. No.: 533,658

[22] Filed: Jun. 5, 1990

[51] Int. Cl.⁵ .............................................. H04Q 7/04
[52] U.S. Cl. ....................................... 379/60; 379/221
[58] Field of Search ................... 379/59, 60, 63, 220, 379/221, 225, 240; 455/33

[56] References Cited

U.S. PATENT DOCUMENTS

| | | | |
|---|---|---|---|
| 4,233,473 | 11/1980 | Frost | 379/59 |
| 4,398,063 | 8/1983 | Hass et al. | 379/60 |
| 4,475,010 | 10/1984 | Huensch et al. | 455/33 |
| 4,485,486 | 11/1984 | Webb et al. | 455/33 |
| 4,556,760 | 12/1985 | Goldman | 379/60 |
| 4,562,572 | 12/1985 | Goldman et al. | 379/60 |
| 4,578,815 | 3/1986 | Persinotti | 455/33 |
| 4,613,990 | 9/1986 | Halpern | 455/33 |
| 4,628,152 | 12/1986 | Akerberg | 379/60 |
| 4,644,351 | 2/1987 | Zabarsky et al. | 455/33 |
| 4,658,416 | 4/1987 | Tanaka | 379/60 |
| 4,670,899 | 6/1987 | Brody et al. | 379/60 |
| 4,670,905 | 6/1987 | Sandvos et al. | 455/33 |
| 4,670,906 | 6/1987 | Thro | 455/33 |
| 4,696,051 | 9/1987 | Breeden | 455/33 |
| 4,700,374 | 10/1987 | Bini | 379/60 |
| 4,704,733 | 11/1987 | Kawano | 455/33 |
| 4,737,978 | 4/1988 | Burke et al. | 379/60 |
| 4,775,999 | 10/1988 | Williams | 319/59 |
| 4,829,554 | 10/1988 | Barnes et al. | 379/63 |

FOREIGN PATENT DOCUMENTS

WO8703438 6/1987 World Int. Prop. O. .

OTHER PUBLICATIONS

"Cellular Intersystem Handoff: Creating Transparent Boundaries" by Grant D. Culp, Vehicular Technology Conference, May 22, 1986, pp. 304–310.
"Nation-Wide Automobile Telephone Service Using New Tracking Exchange Technology" Telecommunication Switching, Proceedings of Interntional Switching Symposium, May 7-11 1984, Session 32B, Paper 4.
"Cellular Radiotelecommunications Intersystem Operations" IS-41.1-A through IS-41.5-A.

Primary Examiner—Jin F. Ng
Assistant Examiner—Dwayne D. Bost
Attorney, Agent, or Firm—A. G. Steinmetz

[57] ABSTRACT

A method and apparatus to minimze the number of connecting trunks and MTSOs is operative to minimize the number of tandem MTSOs involved in handing the call by determining if the target MTSO has inter MTSO trunk connections with at least one of the MTSOs in the chain of existing tandem connections that may be utilized to minimize the total number of tandem MTSO connections involved in handling the call. This is operative without the target MTSO being in the direct chain of tandem MTSO connections.

9 Claims, 7 Drawing Sheets

MOBILE TELEPHONE INTRASYSTEM AND INTERSYSTEM ENHANCED HANDOFF METHOD AND APPARATUS FOR LIMITING TRUNK SWITCHING CONNECTIONS

FIELD OF THE INVENTION

This invention relates to cellular radiotelephone systems and in particular to a method and apparatus for minimizing tandem trunk connections during intrasystem and intersystem handoffs.

BACKGROUND OF THE INVENTION

Cellular mobile radiotelephone systems are broken up into a plurality of serving cells each of which use a particular set of radiotelephone communication channel frequencies to communicate with mobile radiotelephones operating within the boundaries of the cell. Adjacent cells use different sets of radiotelephone communication channel frequencies to prevent interference between the communication channels of the serving cell and adjacent cells. When the mobile leaves a particular serving cell a handoff operation switches the existing established call from the serving cell (i.e. the source cell) to a new target cell which becomes a new serving cell. This handoff process automatically changes the communication channel frequency from that of the original serving cell to a communication channel frequency of the target and subsequent serving cell.

A plurality of individual cells are normally grouped together and are connected to a mobile telephone switching office (MTSO) also sometimes designated as a mobile serving center (MSC), which interconnects the cells to a land line telephone system. Various MTSOs representing different systems are interconnected by land line trunks. As the mobile radiotelephone unit passes from one cell to another the resulting handoff process may connect the mobile radiotelephone unit to a different MTSO which is in turn connected, via a trunk line, to the MTSO of the original serving cell. If the mobile radiotelephone traverses a larger number of cells requiring a plurality of handoffs the inter MTSO trunk line connection may result in accumulation of a series of redundant MTSO inter trunk connections between the originating cell and the existing serving cell. Some of these trunk connections may overlaps, creating duplication of trunk connections, or may create an accumulation of a series of tandem trunk connections that are unnecessary and undesirable. These accumulative trunk and associated MTSO connections are known as tandem trunk connections and the related MTSO are known as tandem MTSOs. The tandem MTSO is defined as one involved in the call connection and handling, but it is neither a serving nor an originating MTSO.

The problem of accumulating tandem trunk connections as a result of successive handoffs has been addressed in a handoff limiting method disclosed in U.S. Pat. No. 4,398,063 (063) assigned to the assignee of this application. In a situation of successive handoffs, each successive serving MTSO maintains a list of the MTSOs previously involved in handling the call. The number of tandem connections resulting from the successive handoffs are reduced by having the serving MTSO determine if the target MTSO is already one of the previously included tandem connected MTSOs on the list of the MTSOs involved in handling the call but not directly serving the mobile radiotelephone. If the target MTSO is already in the chain of tandem connections, the existent serving MTSO initiates a drop back to that target MTSO so that all trunk connections in the chain of tandem connections completed subsequent to the present handoff to the now target MTSO are disconnected at the time that target MTSO assumes the role of the serving MTSO.

A large number of handoffs may result in an accumulation of tandem trunk connections involving a plurality of tandem MTSOs in which none of the accumulating target MTSOs has previously been operative as a serving MTSO. Frequently the travel route of the roaming mobile radiotelephone unit is such that the number of tandem MTSOs may be reduced due to availability of existing inter MTSO trunk connections, however the pattern of accumulation of tandem MTSOs is such that the aforementioned tandem MTSO reduction system is not operative to minimize tandem connections and reduce the number of tandem MTSOs.

SUMMARY OF THE INVENTION

A method and apparatus to minimize the number of connecting trunks and MTSOs, accumulating during a succession of handoffs, is operative in accord with the principles of the invention to minimize the number of tandem MTSOs involved in handling the call by determining if the target MTSO has inter MTSO trunk connections with at least one of the MTSOs in the chain of existing tandem connections that may be utilized to minimize the total number of tandem MTSO connections involved in handling the call. This is operative without the target MTSO being in the direct chain of tandem MTSO connections.

During the accumulation of a series of tandem MTSO connections in a sequence of multiple handoffs a list of MTSOs involved in the handling of the call is developed and passed from each serving MTSO to the target MTSO. This list is combined with known inter MTSO connection arrangements included in data storage of the target MTSO to facilitate a reduction in the number of tandem MTSOs involved in handling the call.

DETAILED DESCRIPTION

Figure 1:
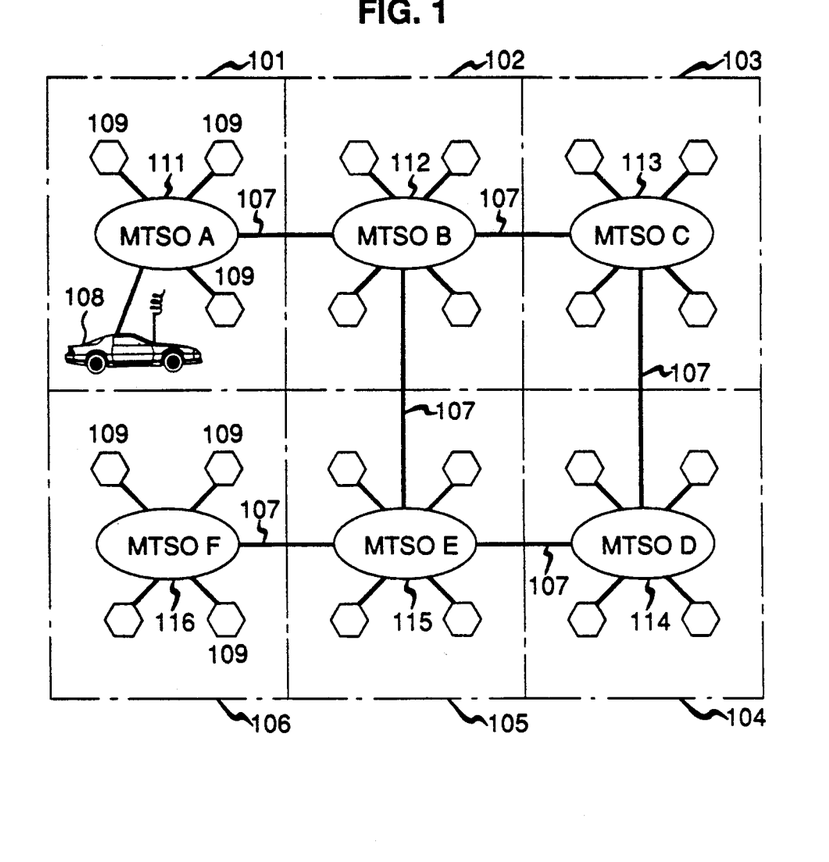
FIG. 1 is a schematic diagram of a cellular mobile radiotelephone network in which the invention may be applied.

A typical array of mobile service networks is shown in FIG. 1 and comprises a plurality of mobile serving areas 101–106. Each serving area includes at least an MTSO 111–116 to interconnect the cells 109 servicing the mobiles 108 to the land telephone network. Each MTSO is also coupled by voice and data trunk lines 107 to other MTSOs in some prescribed fashion. As the traveling mobile passes from one cell 109 to another, the controlling MTSO controls handoffs between the cells it individually controls. When the traveling mobile passes from one serving area 101-106 to another serving area the present serving MTSO arranges for a handoff to the target MTSO of the new serving area. The originating MTSO maintains the connection to the land telephone network and communicates with the new MTSO via the voice trunk line interconnecting the original MTSO and the target MTSO. In the event that the mobile 108 traverses a series of serving areas 101-106, a plurality of sequential/tandem trunk connections 107 between succeeding MTSOs will accrue.

In the absence of specific control arrangements the accrued tandem connection may include unnecessary trunk connections. This unnecessary accrual of tandem trunk connections may adversely affect the quality of the call. One prior art method of limiting the number of tandem trunk connections is disclosed in the prior U.S. Pat. No. 4,398,063 (063) in which provision is made for limiting the number of tandem trunk interconnections between successive MTSOs when a handoff to one of these MTSOs is feasible. The control process of this patent is detailed in the flow charts shown in FIGS. 3-5. The details of this system and process disclosed in the (063) patent are incorporated herein by reference.

Figure 2:
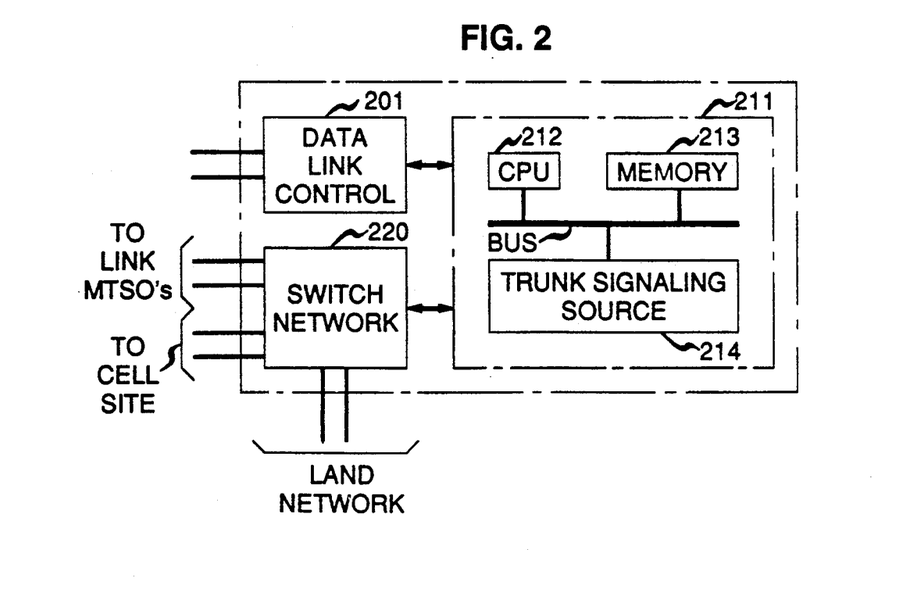
FIG. 2 is a block diagram of an MTSO used in implementing the invention.

The physical equipment controlling the land and inter MTSO connections of the MTSO is shown in FIG. 2. A stored program controller 211 includes a processor 212, a memory unit 213 and a trunk signalling source 214, which are operative for controlling the establishment of communication between cell sites, under control of a MTSO, and a mobile radiotelephone. The switch network 220 controlled by the controller 211 controls voice path switching between the MTSO and the land network and to other MTSOs in accessible adjacent serving areas. A data link controls 201 controls signalling between the MTSOs and its cell sites in the serving area.

Figure 3:
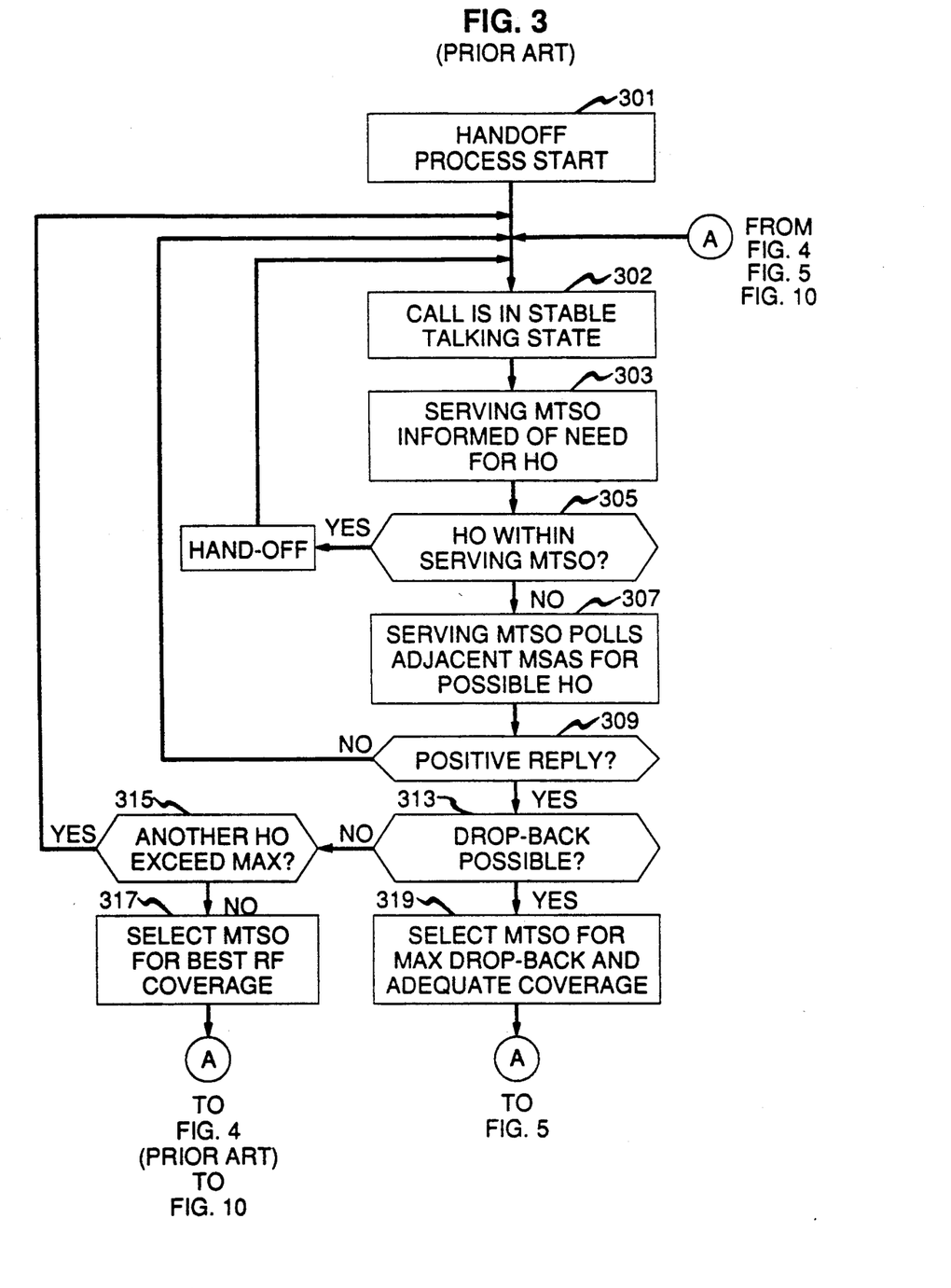
FIGS. 3, 4 and 5 are process flow diagrams delineating the process of a handoff according to the prior art.
Figure 4:
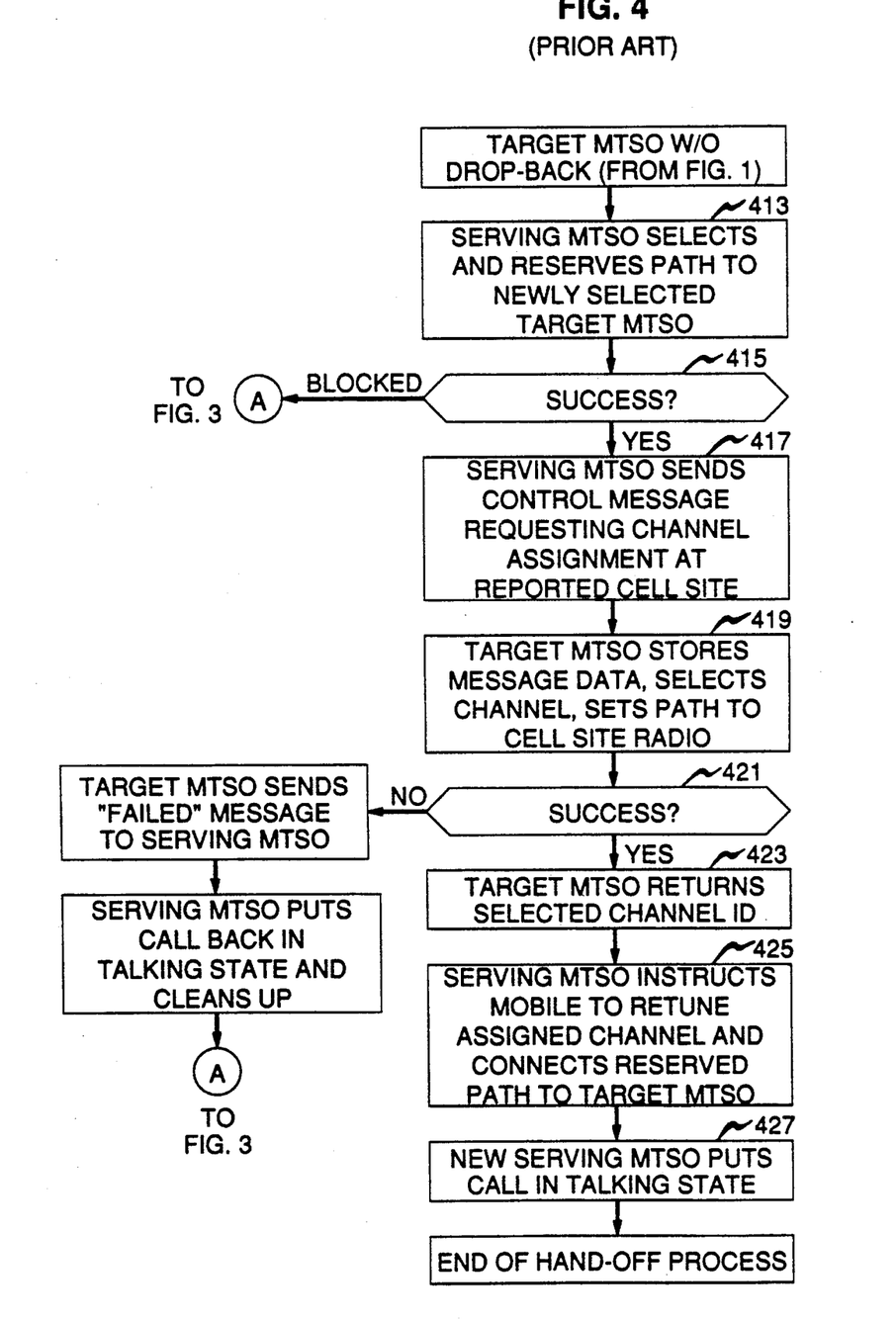
Figure 5:
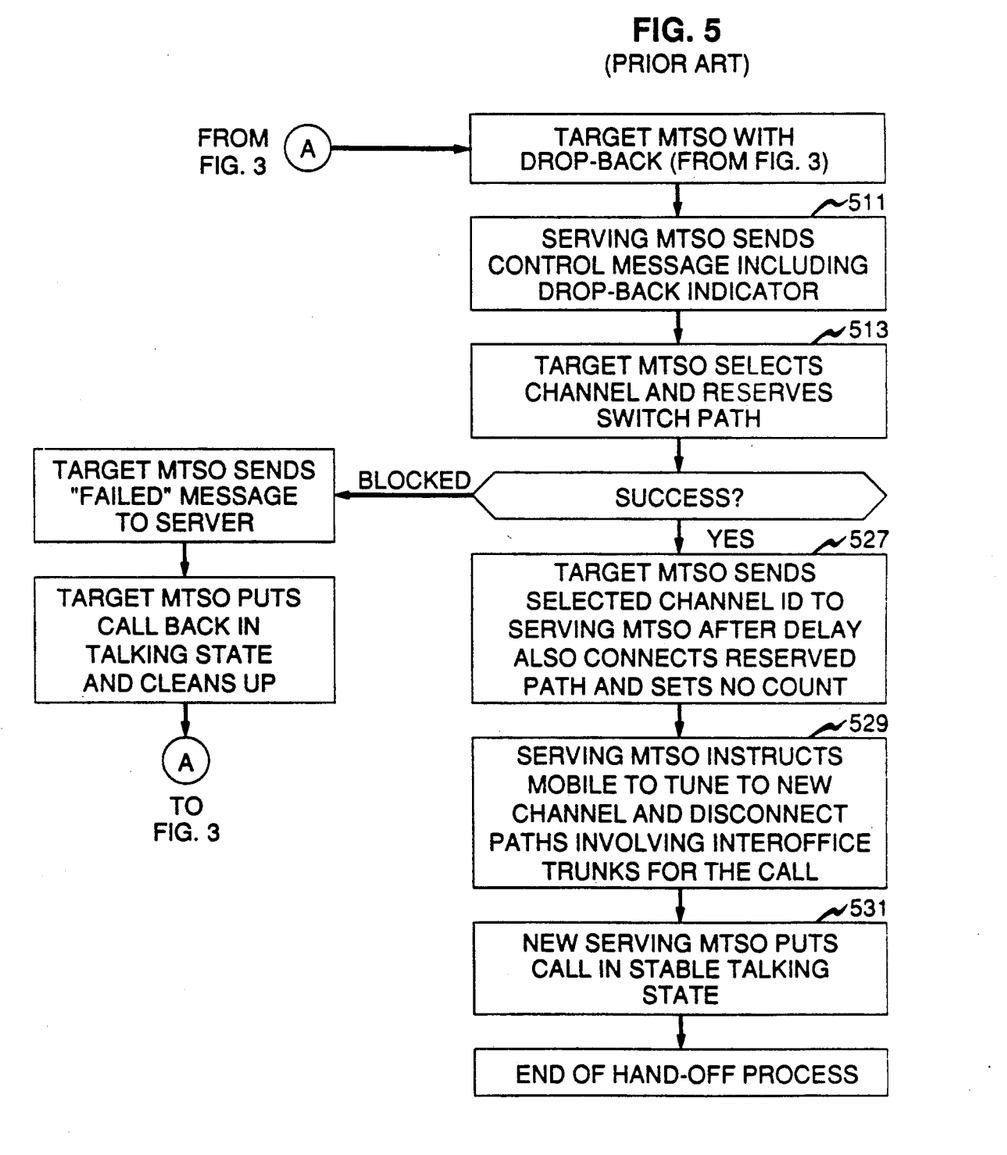

The flow charts of FIG. 3-5 (prior art disclosed in the (063) patent) deal with the process of a handoff of a call in progress controlled by the stored program. The description of U.S. Pat. No. 4,398,063 concerning this flow process is incorporated by reference.

The handoff process begins when the mobile passes from one serving area to another serving area (step 301). When the need for a handoff is determined (step 303), the other cell sites of the serving MTSO are immediately considered (step 305). If one of these cell sites is suitable, based on the signal characteristics considered, a handoff is made to that suitable cell site (step 304). If handoff to a different serving MTSO is required the adjacent MSAs (mobile service areas) are interrogated for accepting a possible handoff (step 307). If the reply is negative (step 309) the flow returns to node 302 in the flow process. With a positive response the possibility of a drop back is considered (step 313). At this juncture the serving MTSO queries if the target MTSO is included in the list of prior serving MTSOs to determine if a drop back is possible (step 313) to eliminate unnecessary tandem trunk connections. The appropriate drop back MTSO is selected in step 319.

If a drop back is not possible (step 313) the effect in adding another tandem trunk connection is evaluated (step 315) to determine if a limit of connections would be exceeded by the addition of this MTSO. If the tandem connections are within the limit the best available MTSO is selected for handoff (step 317).

The serving MTSO, as shown in the flow chart of FIG. 4, creates the necessary call connection (step 413) and if this connection is successful (step 415) the serving MTSO sends control data to the target MTSO including a list of tandem MTSOs in the call connection (steps 417, 419). If the handoff is successful (step 421) the necessary commands for retuning the frequency of the mobile radiotelephone are issued (steps 423, 425). The target MTSO now becomes the serving MTSO (step 427).

When a drop back is feasible, as shown in the flow chart of FIG. 3, (step 313) a new MTSO is selected for providing the maximum drop back (step 319). The necessary control signals are issued by the serving MTSO (steps 511, 513) to retune the mobile radiotelephone to a channel available at the target MTSO. If the handoff is deemed to be successful the new serving MTSO computes a handoff count reflecting the connection state that the drop back will provide (step 527). The mobile radiotelephone is tuned to a new channel (steps 529-531) and the handoff process is now complete and the process is ended at step 533. Further details of this process may be ascertained by reference to the cited U.S. Pat. No. 4,398,063.

Figure 6:
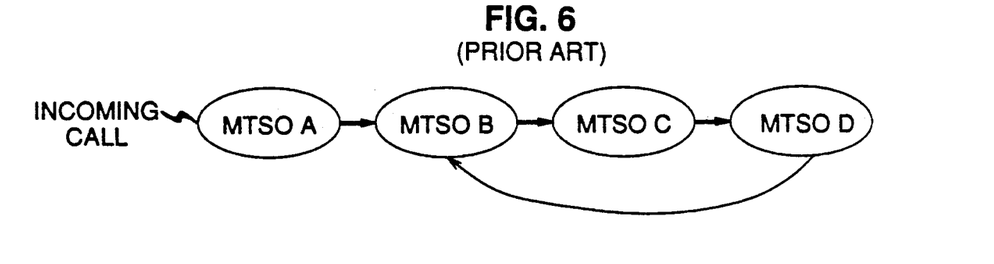
FIGS. 6 and 7 are simplified schematic diagrams delineating multiple handoff processes according to the prior art.
Figure 7:
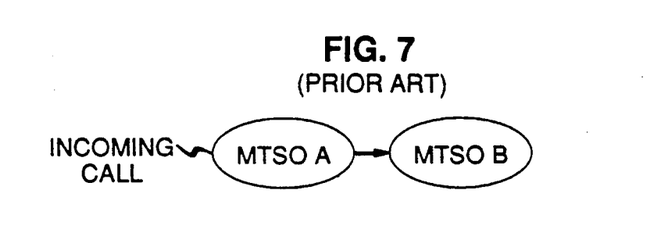

The effect on the aforedescribed handoff process may be ascertained by reference to the diagram of FIGS. 6 and 7 which delineate the trunk connections between MTSOs during a handoff and drop back in an illustrative example of inter MTSO trunk connections. As shown in FIG. 6, a series of successive handoffs has resulted in a plurality of tandem trunk connections from MTSO A to MTSO B to MTSO C to MTSO D. The mobile radiotelephone is to be handed off to MTSO B which is already included in the series of tandem trunk connections. As indicated in the description of the handoff process of FIGS. 3-5, the stored program will recognize that the target MTSO B is in the series of existing tandem connections and that by executing a drop back the tandem connections between MTSO B-MTSO C-MTSO D can be eliminated resulting in the simplified connection shown in FIG. 7 which involves only the intertrunk connection between MTSO A and MTSO B. The drop back procedure described with reference to FIGS. 3-7 is only operative if the target MTSO is already included in the series of tandem connections.

Figure 8:
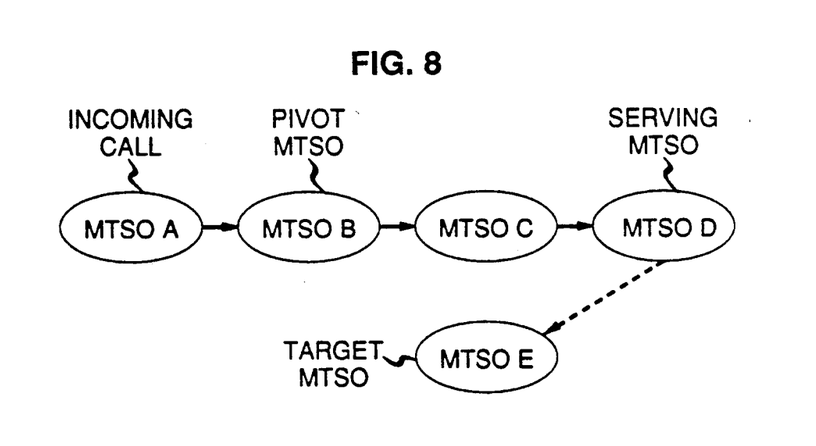
FIGS. 8 and 9 are simplified diagrams delineating handoff processes according to the principles of the invention.
Figure 9:
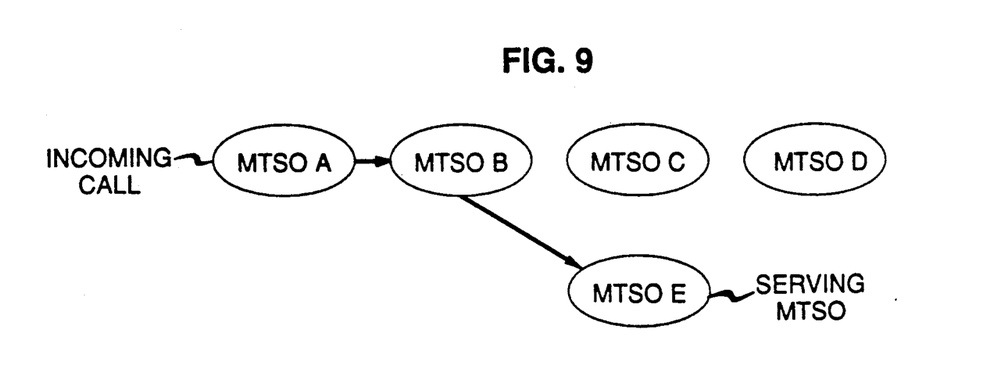

In the arrangement schematically shown in FIG. 8, the target MTSO E is not included in the previous series of tandem connections. To connect MTSO D directly to MTSO E would merely extend and increase the number of tandem connections. In accord with the principles of the invention, the list of MTSOs included in the series of tandem connections is passed from each serving MTSO to each succeeding serving MTSO. A target MTSO such as MTSO E includes a list (connections list) of other MTSOs with which it has trunk connections. This list is compared with the list (tandem list) of the MTSOs included in the existing tandem connection of MTSOs. A pivot MTSO, an MTSO which is on both the connections list and the tandem list, is identified. In the illustrative example MTSO B is a pivot MTSO and hence is on the two lists. So after the handoff from MTSO D to MTSO E the connections MTSO B-MTSO C-MTSO D are dropped and the MTSO E is directly connected to the MTSO B, as shown in the schematic of FIG. 9, thereby reducing the number of tandem connections. MTSO E in the illustrative example may either be in the same or in another cellular system as is MTSO D.

Figure 10:
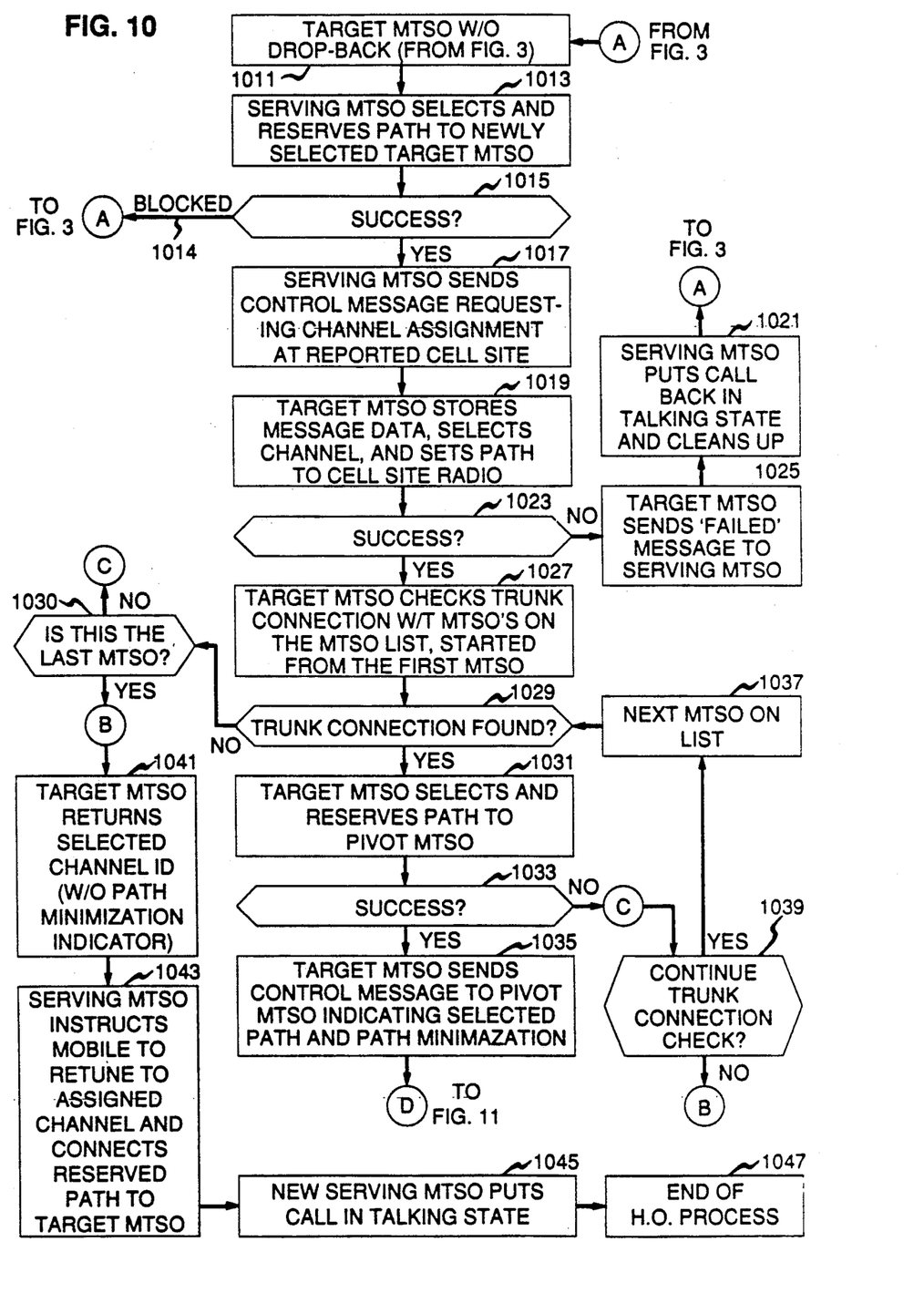
FIGS. 10 and 11 are process flow diagrams delineating the process of handoff according to the principles of the invention.
Figure 11:
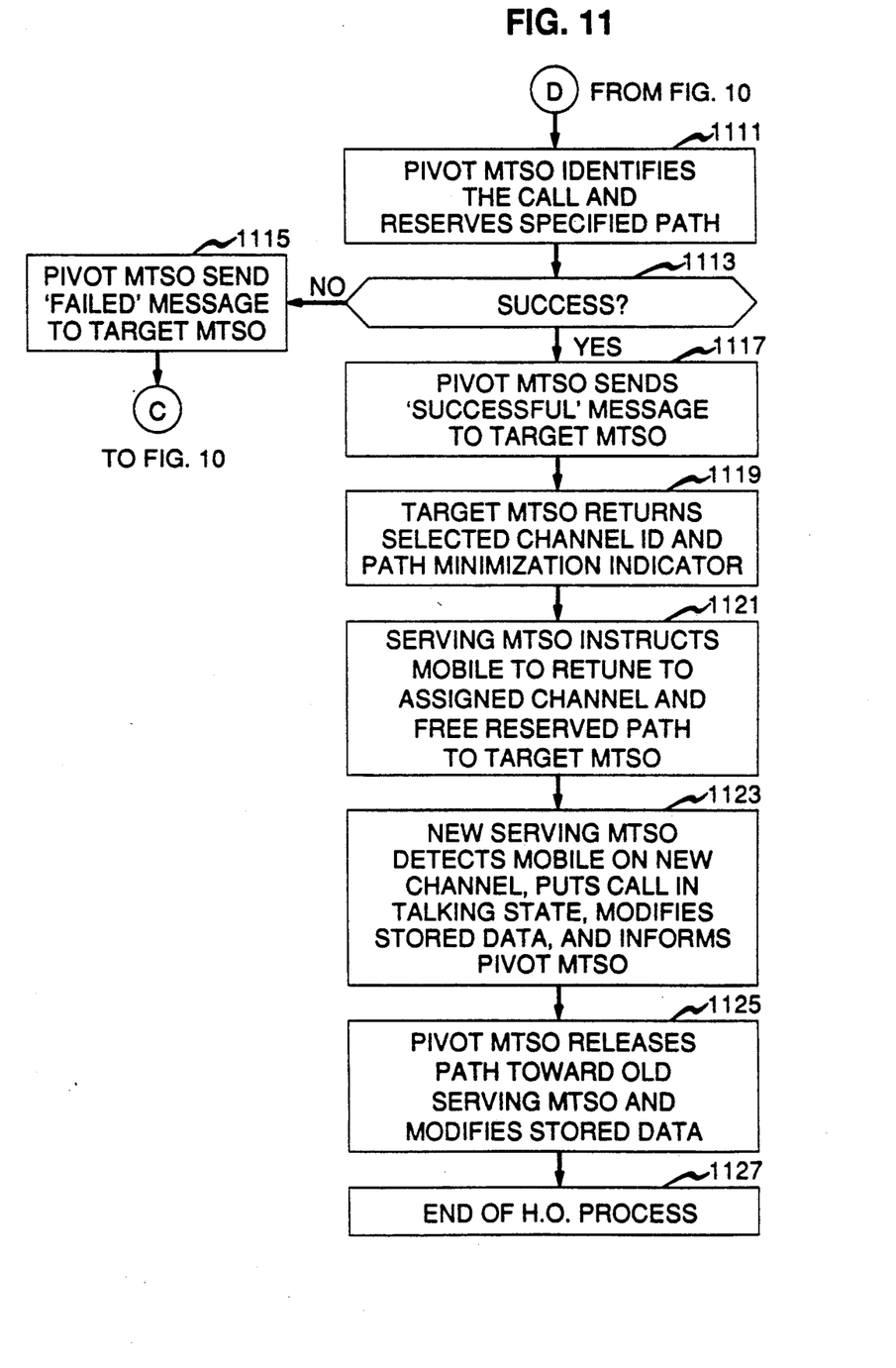

The process for reducing the number of tandem connections, when the target MTSO is not on the list of existing tandem connections, is implemented by the stored program of the serving and target MTSOs as shown in the flow charts illustrated in FIGS. 10 and 11. The flow of control is extended from step 317 of the flow processing delineated in FIG. 3 and begins in step 1011 wherein the target MTSO has been identified. A trunk path is now selected between the serving MTSO and the target MTSO (step 1013). If the connection fails (step 1015) the process returns via path 1014 to the original process of FIG. 3. If the intended connection is successful (step 1015) the serving MTSO sends a control message to the target MTSO (step 1017) providing the necessary control information such as interconnecting trunk identification, current total handoff count, and the current list of tandem connected MTSOs and the mobile radiotelephone identifications. This message (step 1017) also requests a frequency assignment for the mobile radiotelephone in the intended target cell site to which the radiotelephone will be connected.

The target MTSO stores the received data (step 1019) and selects a communication channel at the indicated target cell site. A path from the designated interconnecting trunk to the proper channel of the selected target cell site is established. If the desired path is unavailable (step 1023) a failure message is sent to the serving MTSO (step 1025). In the next step 1021 the serving MTSO puts the state indication back to the talking state and releases the reserved switch path and trunk. The process loops back to the node 302 in FIG. 3.

If the path is connected successfully (step 1023) the target MTSO checks to see if there is a path between itself and the MTSOs on the list of the MTSOs included in the tandem connections up to this juncture in the successive connections process (step 1027). This check begins with the first MTSO on the list. An evaluation is made to determine if a suitable trunk connection has been found (step 1029). If a path cannot be found and the MTSO is the last MTSO on the list (step 1030), the process continues to point B to step 1041 where the target MTSO returns the selected channel identification to the serving MTSO. The serving MTSO (step 1043) instructs the mobile unit to retune to the newly assigned frequency, and connects the previously reserved path between the interconnecting trunk and the incoming trunk (step 1043). If further disconnects the circuit path to the old serving cell site. The target MTSO becomes the new serving MTSO and places the call in the serving state (step 1045).

If a path can be found, the target MTSO selects and reserves a path to the pivot MTSO (step 1031). If the intended reservation of a path is not successful (step 1033) and the last MTSO on the list has not been reached, the process continues through point C where the target MTSO checks whether to continue the trunk connection (step 1039). If the decision is yes, the list of available connections is examined to find a new possible pivot MTSO (step 1037).

If a path to the pivot MTSO can be reserved, the target MTSO sends control message to the pivot MTSO indicating path minimization and the selected path (step 1035).

The pivot MTSO acts, in the process of FIG. 11, to attempt to identify the call and identify the reserved path (step 1111). If the call and trunk circuit number cannot be identified (step 1113) the pivot MTSO sends a failed message to the target MTSO (step 1115) and the process passes from step 1033 via node C at FIG. 10, to the process of step 1039 FIG. 10 as discussed herein above.

If the call and trunk number is successfully identified, the pivot MTSO reserves the specified trunk circuit and sends a successful message to the target MTSO (step 1117). This optimally permits the pivot MTSO to bridge the trunk circuit to the target MTSO to the existing call.

The target MTSO returns the selected channel identification and a path minimization indicator to the serving MTSO (step 1119). The serving MTSO instructs the mobile to retune to the assigned channel and releases the previously reserved path to the target MTSO (step 1121). When the target MTSO determines that the mobile radiotelephone has retuned to the new frequency, it becomes the new serving MTSO. The new serving MTSO places the call in the talking state, modifies the stored data accordingly and informs the pivot MTSO that the mobile radiotelephone has retuned to the new frequency (step 1123). The pivot MTSO releases the paths connected to the old serving MTSO and modifies the stored data.

We claim:

1. A method for minimizing tandem trunk connections as a result of a succession of handoffs of a mobile radiotelephone in a cellular telephone system,
   comprising the steps of:
   including with an MTSO an available connection list of trunk connections to other MTSOs.
   compiling a cumulative tandem connection list of successive MTSOs connected in tandem in a succession of consecutive handoffs of a continuous cell of a mobile radiotelephone,
   comparing the available connection list of a target MTSO in a handoff with the cumulative tandem connection list of a serving MTSO,
   identifying a pivot MTSO by selecting an MTSO common to both lists that minimizes a number of tandem connections,
   handoff the mobile radiotelephone to the target MTSO, and directly connect the target MTSO to the pivot MTSO.

2. A method for minimizing tandem trunk connections as claimed in claim 1, and
   comprising the step of:
   identifying a potential target MTSO for a handoff from a serving MTSO,
   transmitting the cumulative tandem connection list of the serving MTSO to the target MTSO,
   the target MTSO becomes the current serving MTSO, defines a pivot MTSO and reserves a trunk connection to the pivot MTSO, and
   disconnecting all tandem connections between the pivot MTSO and the current serving MTSO.

3. A method for minimizing tandem trunk connections as claimed in claim 2, and
   comprising the step of:
   modifying the list of tandem connections included with the current serving MTSO by removing the disconnected tandem connections.

4. A method for minimizing tandem trunk connections as claimed in claim 1, and
   comprising the step of:

disconnecting all tandem path connections between the pivot MTSO and the prior serving MSTO preceding the current serving MTSO.

5. A method for minimizing tandem trunk connections as claimed in claim 4, and
comprising the step of:
removing the disconnected tandem connections from the tandem connection list in the current serving MTSO.

6. A cellular telephone system, comprising:
a plurality of mobile telephone switching offices (MTSO), each controlling a plurality of cell sites with antennas for communicating with mobile radiotelephones,
communication trunks connected between ones of the mobile telephone switching offices,
apparatus for facilitating a handoff of a mobile radiotelephone from one cell site antenna to another cell site antenna and from one MTSO to another MTSO and operative for permitting extended handoffs in which the land connections include a plurality of MTSOs in tandem connection,
means for compiling a list of the tandem connections included in a call connection,
means for identifying available trunk connections between a target MTSO and MTSOs identified in the list of tandem connections, and
means for directly establishing a trunk connection between the target MTSO and a pivot MTSO to minimize the number of tandem connections and disconnecting a portion of the trunk connection of the MTSOs included in the list of the tandem connections.

7. A cellular telephone system as claimed in claim 6, comprising:
means for transmitting the cumulative tandem connection list of the serving MTSO to the target MTSO,
and means for reserving a trunk connection to the pivot MTSO,
means for converting the target MTSO to a serving MTSO, and
means for disconnecting all tandem connections between the pivot MTSO and the current serving MTSO other than a direct connection between the pivot MTSO and the current serving MTSO.

8. A cellular telephone system as claimed in claim 7, comprising:
means for modifying the list of tandem connections included with the current serving MTSO by removing the disconnected tandem connections.

9. A cellular telephone system as claimed in claim 8, comprising:
means for disconnecting all path connections between the pivot MTSO and the serving MSTO preceding the current serving MTSO.

* * * * *